Sept. 27, 1938.　　　E. W. KIRKPATRICK　　　2,131,288
POWER DRIVE DEVICE
Filed May 19, 1936　　　3 Sheets-Sheet 1
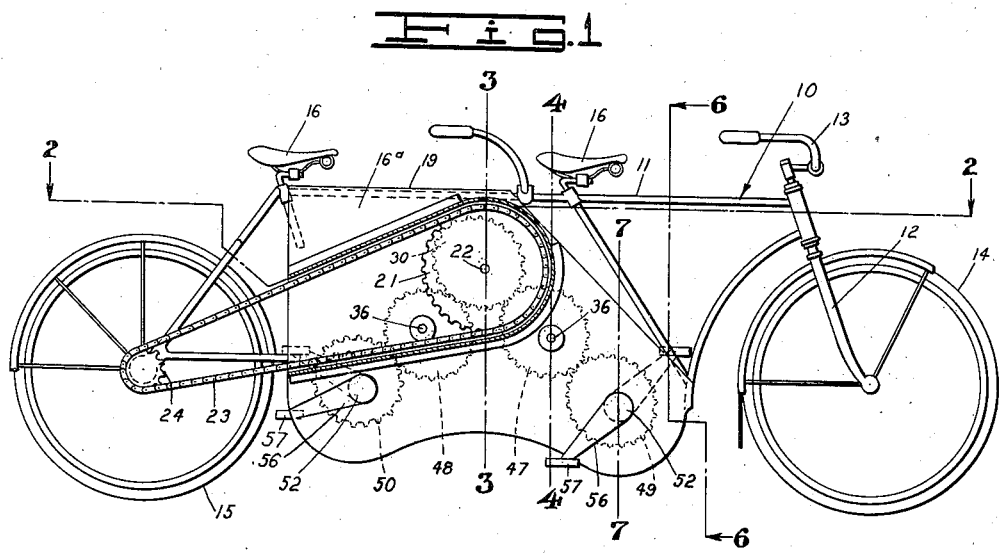
INVENTOR.
E. W. KIRKPATRICK.
BY
ATTORNEY.

Sept. 27, 1938.  E. W. KIRKPATRICK  2,131,288
POWER DRIVE DEVICE
Filed May 19, 1936  3 Sheets-Sheet 2
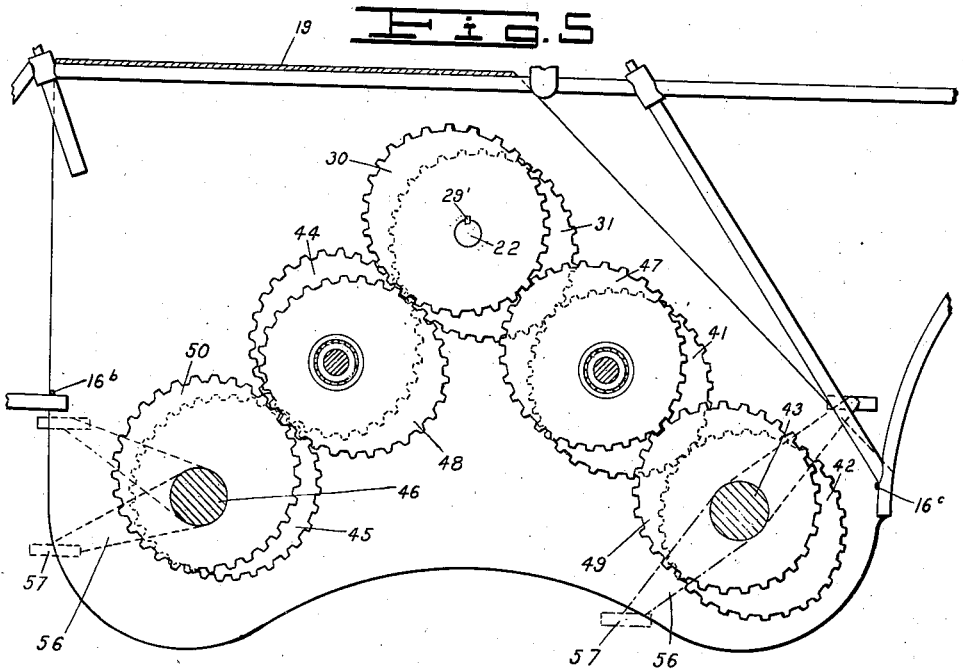
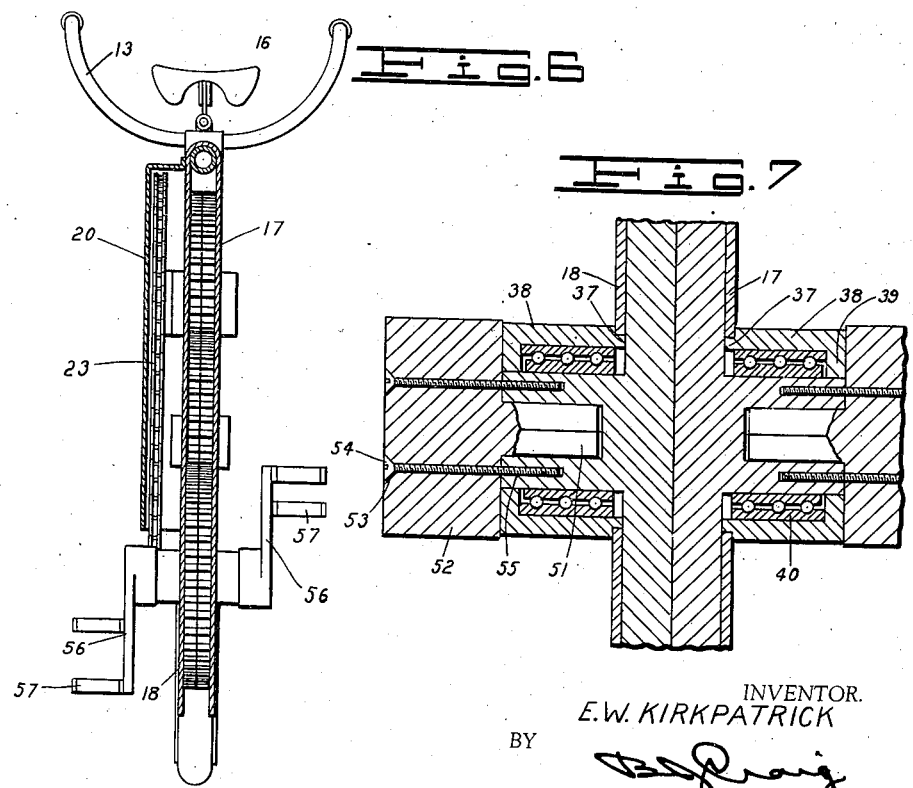
INVENTOR.
E. W. KIRKPATRICK
BY
ATTORNEY.

Sept. 27, 1938. E. W. KIRKPATRICK 2,131,288
POWER DRIVE DEVICE
Filed May 19, 1936  3 Sheets-Sheet 3
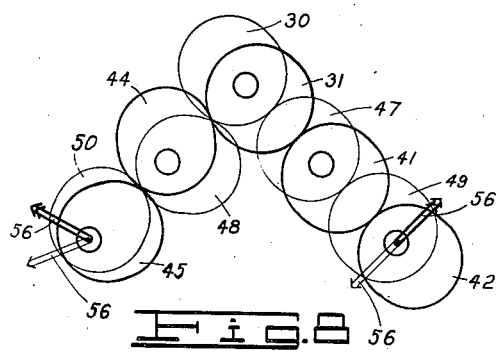
Fig.8
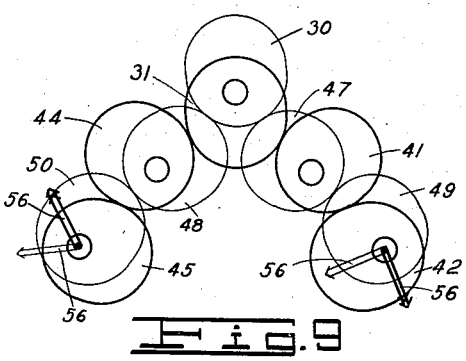
Fig.9
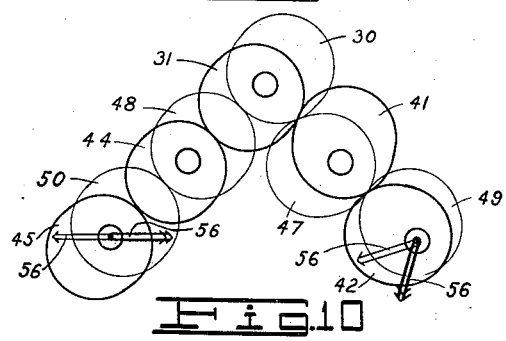
Fig.10
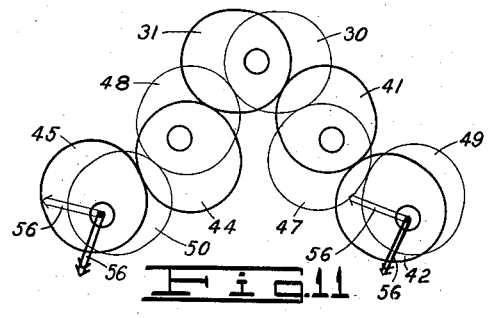
Fig.11
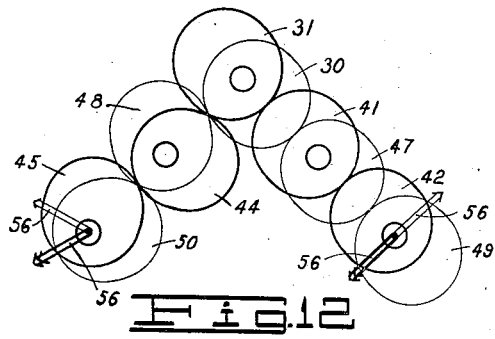
Fig.12
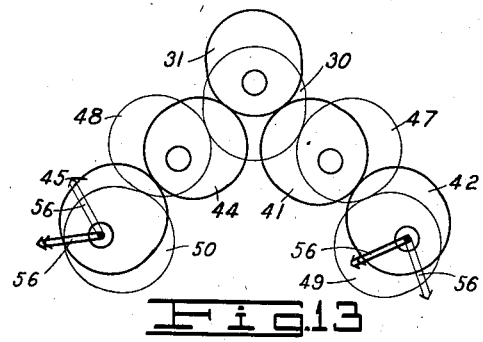
Fig.13
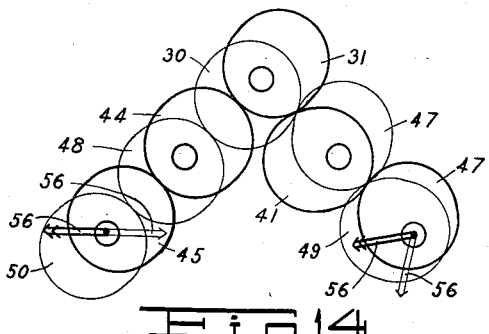
Fig.14
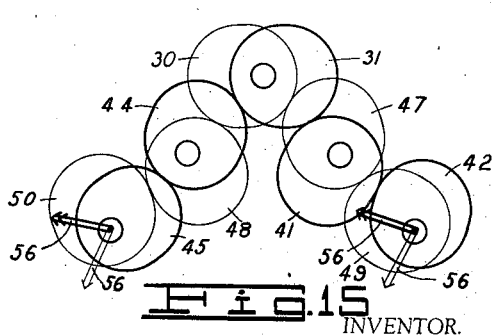
Fig.15
INVENTOR.
E. W. KIRKPATRICK
BY 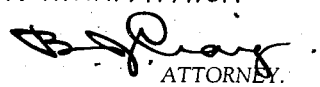
ATTORNEY.

Patented Sept. 27, 1938

2,131,288

UNITED STATES PATENT OFFICE 2,131,288

POWER DRIVE DEVICE

Ephraim Wallace Kirkpatrick, Los Angeles, Calif

Application May 19, 1936, Serial No. 80,549

3 Claims. (Cl. 74—437)

This invention relates to a drive device.

The general object of the invention is to provide an improved gear drive device wherein the application of power to a driving member may be advantageously transferred to a driven member.

A more specific object of the invention is to provide a gear driven mechanism which is particularly adapted for use in the propulsion of a bicycle.

Another object of the invention is to provide a novel arrangement of elliptical gears for driving a bicycle.

A further object of the invention is to provide a novel mechanical movement which is of general application.

Other objects and the advantages of this invention will be apparent from the following description taken in connection with the accompanying drawings, wherein:

Fig. 1 is a side elevation, partly in section, showing my invention as applied to a tandem bicycle;

Fig. 2 is a section taken on line 2—2 of Fig. 1;

Fig. 3 is a section taken on line 3—3 of Fig. 1;

Fig. 4 is a section taken on line 4—4 of Fig. 1;

Fig. 5 is a section taken on line 5—5 of Fig. 2;

Fig. 6 is a section taken on line 6—6 of Fig. 1;

Fig. 7 is a section taken on line 7—7 of Fig. 1; and

Figs. 8 to 15, inclusive, are diagrammatical views showing the arrangement of the pedals and gears in various positions.

Referring to the drawings by reference characters I have shown my invention as embodied in a tandem bicycle which is indicated generally at 10. As shown the bicycle includes a frame 11 having a front fork 12 with handle bars 13 by means of which the bicycle may be steered. The front fork 12 is supported on a front wheel 14 while the rear of the frame is supported by a rear wheel 15. Suitable saddles 16 are arranged on the frame and the bicycle may be provided with the usual mud guards, coaster brake, etc., as desired.

The frame is provided with a metal housing 16ª which is welded to the frame as at 16ᵇ and 16ᶜ and includes side plates 17 and 18. The housing 16ª also includes an integral top portion 19 which fits over the rear of the top member of the frame. On the side 18 of the housing I mount a supplemental housing 20 within which I arrange a sprocket wheel 21 which is keyed on a shaft 22. A sprocket chain 23 passes over the sprocket 21 and also passes over a sprocket 24 secured on the rear axle of the bicycle.

The shaft 22 as shown in Fig. 3 is mounted in ball races 25 and 26. The ball race 25 is fitted in a cup 27 which is shown as welded as at 28 to the side 18 of the housing while the ball race 26 is mounted on a cup 29 shown as welded at 30 on the side 17 of the housing. On the shaft 22 is a key 29′ and on the shaft and engaging the key 29′ I arrange a pair of driven gears 30 and 31.

These driven gears 30 and 31 are slightly elliptical in shape and are arranged so that the shaft 22 is coaxial with and passes through one foci of the gears. The gears 30 and 31 are disposed so that they are out of phase 180°. In the construction I now prefer for driving a bicycle the outside diameter of the gears 30 and 31 on the major axis is approximately 6¼″ while the outside diameter on the minor axis is approximately 5⅞″ and each gear has the same number of teeth although the dimensions may be varied to suit each installation.

The side plates 17 and 18 are provided with two sets of pairs of apertures 32 which are aligned and in which are fitted collars 33 (Fig. 4) which are welded as at 34 to hold them in position. The collars 33 include aligned bores 35 in which shafts 36 are mounted and which are held in place by pins 36′. One pair of collars 33 and their shaft 36 is arranged in front of the shaft 22 while the other pair of collars and their shaft is arranged in the rear of the shaft 22. The axes of the shafts 36 are disposed to form a right angle as shown in Figs. 1 and 5.

The side plates 17 and 18 are also provided with two sets of pairs of apertures 37 in which collars 38 are arranged and which have a tight fit therein. These collars 38 are provided with inwardly directed flanges 39 at their ends which engage ball races 40 to be presently described. The collars 38 are arranged in the front and in the rear of the collars 33 and their axes are disposed in alignment with the axes of the shafts 22 and 36 as shown in Figs. 1 and 5.

The gear 31 meshes with an elliptical idler gear 41 which is mounted on the forward one of the shafts 36 and this idler gear 41 meshes with a driving elliptical gear 42 which has a hub 43 engaging in one of the bearings 40. The gear 31 also meshes with another idler elliptical gear 44 on the other shaft 36 and the gear 44 meshes with another driving elliptical gear 45 which has a hub 46 engaging another one of the bearings 40. The gears 41, 42, 44, and 45 are each mounted to rotate about one of the foci thereof and the arrangement is such that power applied to either the gear 42 or the gear 45 will drive the gear 31.

The driven gear 30 meshes with idler gears 47 and 48 and with driving gears 49 and 50 which are similar to and are associated with the gears 41, 42, 44, and 45 and which are similarly mounted. The gears 47, 48, 49, and 50 are out of phase 180° with respect to their associated gears 41, 42, 44, and 45 as shown in the drawings.

The inner faces of the gears are shown as in contact with each other while the outer faces of the gears engage the side plates 17 and 18.

The hubs 46 are hollow and in these hollow hubs I mount projecting portions 51 on crank members indicated at 52. These crank members are provided with apertures 53 through which screws 54 pass and which are threadedly received in apertures 55 in the bosses. The crank members 52 include arm portions 56 on which pedals 57 are mounted. The crank members on the hubs in the leading train of gears are arranged at right angles to the axes of these gears and are so disposed that when the gears 42 and 43 are in a position to exert the greatest power the pedals are in a position to be pushed downwardly by the foot of the operator. For instance, in Fig. 5 the gear 42 is in a position to exert the greatest power during its cycle and the pedal 57 associated therewith is in a position to be urged downwardly by one of the rider's feet. The gear 49 has its pedal arranged at an angle of 180° with respect to the gear 42 so that this pedal will be in an effective position at the proper time.

The gears 50 are provided with pedals 57 which are disposed parallel to the major axes of these gears so that effective pedaling action can be secured.

In Figs. 8 to 15, inclusive, I have shown diagrammatically the arrangement of the pedals and the gears in the various positions assumed and in various steps of 45°. From these figures it will be noted that the pedal which is in a position to be pressed downwardly moves rapidly during the portions of its cycle when the greatest power is to be applied and the same is true of the other pedal. In operating the bicycle the front pedal on one side will first be operated then the rear pedal on the same side will be operated. This will be followed by the front pedal on the opposite side and after this pedal has performed its function the rear pedal on the opposite side will become effective, and in this way there is provided a highly efficient apparatus for operating a bicycle or other device.

From the foregoing description it will be apparent that I have invented a novel drive device which can be economically manufactured and which is highly efficient in use.

Having thus described my invention I claim:

1. In a drive device, a train of meshing gears, said train including two portions arranged at an angle to each other, each of said portions including three gears mounted to rotate about axes disposed in a straight line, each of said gears being elliptical and mounted to rotate about an axis coincident with one of its foci, each of said gears being 180° out of phase with each gear with which it meshes.

2. In a drive device, a train of gears consisting of two portions disposed at substantially right angles to each other, each portion consisting of three meshing gears, one of said gears being common to both portions, the second gear of each portion engaging the one gear, the third gear of each portion engaging the second gear of each portion, each of the gears being elliptical and being mounted to rotate about an axis coincident with one of its foci, each of said second gears being 180° out of phase with the one gear with which it meshes and each of the third gears being 180° out of phase with the second gear with which it meshes and means to drive the third gears of each portion.

3. In a drive device a train of gears consisting of two portions disposed at right angles to each other, each portion of the train including a plurality of meshing gears, one of said gears being common to both portions, each of said gears being elliptical and mounted to rotate about an axis coincident with one of its foci, each of said gears being 180° out of phase with each gear with which it meshes, a second train of gears, said second train consisting of two portions disposed at right angles to each other, each portion of the second train including a plurality of gears with one of the gears common to both portions, each gear of said second train being disposed face to face with and having a common axle with a gear of the first train, the gears of the second train all being elliptical and each being mounted to rotate about an axis coincident with one of its foci, each gear of the second train being 180° out of phase with each gear with which it meshes, the gear common to both portions of the second train being 180° out of phase with the gear common to both portions of the first train, and means to drive the end gears on each portion.

EPHRAIM WALLACE KIRKPATRICK.